(12) United States Patent
Manji et al.

(10) Patent No.: US 11,145,144 B2
(45) Date of Patent: Oct. 12, 2021

(54) WORK VEHICLE AND WORK VEHICLE MANAGEMENT SYSTEM

(71) Applicant: Kubota Corporation, Osaka (JP)

(72) Inventors: Yasuhiro Manji, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 296 days.

(21) Appl. No.: 16/003,566

(22) Filed: Jun. 8, 2018

(65) Prior Publication Data

US 2019/0156595 A1 May 23, 2019

(30) Foreign Application Priority Data

Nov. 21, 2017 (JP) .............................. JP2017-223579

(51) Int. Cl.
| | |
|---|---|
| *G07C 5/04* | (2006.01) |
| *B60L 3/12* | (2006.01) |
| *B60L 58/16* | (2019.01) |
| *B60L 58/12* | (2019.01) |
| *H01M 10/48* | (2006.01) |

(Continued)

(52) U.S. Cl.
CPC .............. *G07C 5/04* (2013.01); *A01D 34/006* (2013.01); *A01D 69/02* (2013.01); *B60L 3/12* (2013.01); *B60L 58/12* (2019.02); *B60L 58/16* (2019.02); *G07C 5/008* (2013.01); *H01M 10/425* (2013.01); *H01M 10/486* (2013.01); *A01D 34/66* (2013.01); *A01D 2101/00* (2013.01); *B60L 2240/545* (2013.01); *B60L 2240/547* (2013.01); *B60L 2240/70* (2013.01); *B60Y 2200/223* (2013.01); *B60Y 2200/91* (2013.01); *H01M 2010/4278* (2013.01); *H01M 2220/20* (2013.01)

(58) Field of Classification Search
CPC ....... G07C 5/04; G07C 5/008; H01M 10/425; H01M 10/486; H01M 2220/20; H01M 2010/4278; B60L 58/12; B60L 58/16; B60L 3/12; B60L 2240/547; B60L 2240/70; B60L 2240/545; B60Y 2200/91; B60Y 2200/223; A01D 69/02; A01D 34/006; A01D 2101/00; A01D 34/66
USPC ........................................................ 701/22
See application file for complete search history.

(56) References Cited

U.S. PATENT DOCUMENTS

| | | |
|---|---|---|
| 2009/0027056 A1 | 1/2009 | Huang et al. |
| 2010/0010704 A1 | 1/2010 | Uchida |

(Continued)

FOREIGN PATENT DOCUMENTS

| | | |
|---|---|---|
| EP | 2639096 A1 | 9/2013 |
| EP | 2657062 A1 | 10/2013 |

(Continued)

*Primary Examiner* — Maceeh Anwari
(74) *Attorney, Agent, or Firm* — The Webb Law Firm (57) ABSTRACT

Disclosed is a work vehicle management system including: a battery work information generation unit that generates battery work information indicating a use state of a battery during work of a work vehicle; a battery deterioration information generation unit that chronologically diagnoses the battery work information to generate battery deterioration information that indicates a deterioration trend of the battery that is unique to the work vehicle; and a notification unit that performs notification of the battery deterioration information to a manager of the work vehicle.

7 Claims, 3 Drawing Sheets

(51) Int. Cl.
*H01M 10/42* (2006.01)
*A01D 34/00* (2006.01)
*A01D 69/02* (2006.01)
*G07C 5/00* (2006.01)
*A01D 34/66* (2006.01)
*A01D 101/00* (2006.01)

(56) References Cited

U.S. PATENT DOCUMENTS

2011/0258838 A1   10/2011  McCabe et al.
2013/0317690 A1*  11/2013  Fujita ................ H01M 10/4285
                                                  701/29.2
2014/0257623 A1*   9/2014  Carl ...................... H04W 4/024
                                                  701/29.4
2017/0225584 A1    8/2017  Jin et al.
2017/0263914 A1    9/2017  Ito et al.

FOREIGN PATENT DOCUMENTS

| JP | 201022155 A * | 1/2010 |
| JP | 201022155 A | 1/2010 |
| JP | 201327202 A | 2/2013 |
| JP | 2017158516 A | 9/2017 |
| WO | WO2012063606 A1 * | 5/2012 |

\* cited by examiner

WORK VEHICLE AND WORK VEHICLE MANAGEMENT SYSTEM

CROSS-REFERENCE TO RELATED APPLICATION

This application claims priority to Japanese Patent Application No. 2017-223579 filed Nov. 21, 2017, the disclosure of which is hereby incorporated in its entirety by reference.

BACKGROUND OF THE INVENTION

Field of the Invention

The present invention relates to a work vehicle that performs work using a battery as a driving source, and a work vehicle management system for managing such a work vehicle. As long as there are no clear limitations, "work" in the following description includes both performing work while causing a vehicle body to travel ("work travel") and performing only work with the vehicle body stopped ("non-traveling work").

Description of Related Art

With a work vehicle including an electric motor that rotates using a battery as a driving source, it is important to handle the battery, and in particular, to prevent over-charging and over-discharging and to determine the battery replacement time. An electric grass mower according to JP 2013-027202A includes a function of calculating an SOC (state of charge; battery remaining amount) based on integrated values of the voltage and current of the battery, and charging/discharging control using the SOC is performed in order to prevent deterioration of the battery due to over-discharging. This kind of charging/discharging control is performed automatically by a control apparatus.

An electric grass mower according to JP 2017-158516A (or US 2017/0263914A1 corresponding thereto) is equipped with multiple battery packs that can be used selectively using a battery switch, and includes a function of controlling switching on and off of the battery switch based on a result of estimating a charge capacity using a charge capacity estimation unit, and based on a result of evaluating battery temperature using a heat evaluation unit. If a battery pack with a charge capacity that is lower than a reference value or a battery pack with a battery temperature that is higher than a reference value is detected, the battery switch connected to that battery pack is switched off. If a backup battery pack is equipped, the battery switch is switched on. Accordingly, switching from a battery pack with a charge capacity that is lower than a reference value to a fully-charged battery pack is performed automatically.

With a work vehicle in which a conventional battery is used as a driving source, charging/discharging control of a battery for the purpose of protecting the battery is performed manually or automatically using the calculated SOC. However, information for checking whether or not driving that is appropriate for the battery is being performed, or in other words, whether or not the battery deterioration trend is appropriate, has not been collected for each work vehicle or driver, despite the fact that the lifespan, discharge time, and the like of the battery are influenced by the way the driver drives, the state of the work site, the weather, and the like. For this reason, a manager of the work vehicle such as the driver cannot find out whether or not the battery deterioration trend is appropriate, and for this reason, a problem may occur in which work and/or traveling that shorten the lifespan of the battery are repeated.

SUMMARY OF THE INVENTION

In view of the foregoing circumstance, there has been desire for a work vehicle management system and a work machine according to which it is possible to provide information that enables determination of whether or not a deterioration trend of a battery equipped in a work vehicle is appropriate. In view of this, first, the following work vehicle management system is proposed.

A work vehicle management system for managing a work vehicle configured to perform work using a battery as a driving source, comprising:

a battery work information generation unit configured to generate battery work information that indicates a use state of the battery during the work of the work vehicle;

a battery deterioration information generation unit configured to chronologically diagnose the battery work information to generate battery deterioration information that indicates a deterioration trend of the battery that is unique to the work vehicle; and a notification unit configured to perform notification of the battery deterioration information to a manager of the work vehicle.

According to this configuration, the use state of the battery of a specific work vehicle is included in the battery work information, and therefore by collecting the battery work information over time and evaluating the collected battery work information using a statistical method, for example, it is possible to diagnose the deterioration trend of a battery that is unique for each work vehicle. For example, it is possible to diagnose the deterioration trend of the battery of the specific work vehicle by comparing a reference use state, which is the average value of the use states of the batteries of many work vehicles, and the use state of the battery of the specific work vehicle. The battery deterioration information obtained in this manner is notified to a manager, such as the driver of the work vehicle being diagnosed, and therefore the manager can objectively check the deterioration trend of the battery.

In one preferable embodiment, the battery work information generation unit and the notification unit are included in a control system of the work vehicle, and the battery deterioration information generation unit is included in a data processing apparatus that is configured to perform data communication with the control system.

With this configuration, if the data processing apparatus is built in a computer that performs a cloud service, the battery deterioration information of each work vehicle can be generated by storing the battery work information of many work vehicles and statistically processing these pieces of battery work information. The data processing apparatus provides the generated battery deterioration information based on a request from the control system of the work vehicle. Notification of the received battery deterioration information is performed by the notification unit through a speaker or a display, and thereby the manager (driver) of the work vehicle can keep track of the use state of the manager's work vehicle, and in particular, the use state (deterioration state) of the battery.

Preferably, the data processing apparatus is provided in a management center away from a work site or in a user terminal owned by a user of a work vehicle, and is connected so as to be able to communicate with an onboard LAN (local area network) of a work vehicle wirelessly or by wire.

In one preferable embodiment, the battery work information includes at least one of temperature history data, SOC (state of charge) history data, voltage history data and charging/discharging instance count data, and the battery deterioration information generation unit calculates a battery overuse level as the battery deterioration information based on at least one of the temperature history data, the SOC history data, the voltage history data and the charging/discharging instance count data.

According to this configuration, the temperature history data is data that can indicate the frequency of the temperature that causes the battery to deteriorate. The SOC history data is data that can indicate the frequency of repeating the low remaining amount, the voltage history data is data that can indicate the frequency of voltage fluctuation that causes the battery to deteriorate, and thus it is possible to keep track of the period of being at a voltage at which the battery deteriorates rapidly. The charging/discharging instance count data is data indicating the number of instances of charging and discharging at a unit date and time. A battery, and in particular, a lithium-type battery, progressively deteriorates depending on conditions such as battery temperature behavior, repetition of battery exhaustion, the deterioration behavior of the battery voltage, and the number of instances of charging/discharging.

With this configuration, the battery overuse level is calculated based on at least one of the temperature history, the SOC history, the voltage history, and the number of instances of charging/discharging, and therefore by performing notification of this battery overuse level, the manager of the work vehicle can keep track of the precise deterioration state of the battery equipped in the work vehicle. In particular, as a simple specific example, it is proposed that the above-described temperature history, SOC history, voltage history, and number of instances of charging/discharging are scored, and the levels "great", "good", "acceptable", and "not acceptable" are determined based on the total value. During the scoring, it is preferable that points are allocated by setting one or more thresholds and classifying each piece of data. With this kind of battery deterioration information, it is also possible to perform notification through a simple LED display.

However, calculation (scoring) is optional, and the precise deterioration state of the battery can be kept track of as long as the battery overuse level can be checked based on at least one of the above-described types of data.

In a preferable embodiment, the battery work information includes the battery work information includes a location of a work site where the work is carried out, a work date and time, and a work load level of the work, and an environment state of the work site and an appropriate work load level are added as attribute information of the battery deterioration information. This configuration is advantageous in the following respects.

The environmental state such as the ground state of the work site and the weather on that day is derived through a web service or the like based on the position of the work vehicle during work, which can be easily acquired by the work vehicle by equipping a satellite positioning module such as a GPS (global positioning system), and based on the work date and time.

Also, if the work vehicle is provided with selectable work modes that are divided according to work load, the load level of the work can be determined based on the selected work mode.

Also, as long as the work vehicle includes a function of detecting the load of the electric motor or a function of detecting the work amount, the load level of the work can be determined based on the detected motor load or work amount.

By employing these kinds of configurations, the manager of the work vehicle can, based on the attribute information of the battery deterioration information, keep track of the work environment in which the work that resulted in the content indicated by the battery deterioration information was carried out. Accordingly, it is possible to plan future improved use of the work vehicle that performs work using the battery as the driving source.

Preferably, the appropriate work load level is a level that is recommended for appropriate use of the battery, and is derived from data obtained from at least one of the following functions:

(1) a function of performing estimation of a work trend and estimation of the battery deterioration trend based on a chronological evaluation of a work date and time and a work mode, and using the estimation result as the battery deterioration information;

(2) a function of correcting original data relating to battery deterioration included in the battery deterioration information according to a work travel location;

(3) a function of calculating motor energy consumption for each driver or for each work vehicle;

(4) a function of statistically analyzing a work time and a work amount for each driver or for each work vehicle;

(5) a function of, if the battery is constituted by a plurality of battery packs, calculating an overuse level for each battery pack using a battery pack ID;

(6) a function of calculating a battery lifespan from a battery remaining amount when fully-charged;

(7) a function of calculating a deterioration correction value during battery storage from the battery remaining amount when the vehicle is stopped; and (8) a function of statistically analyzing an abnormality of the battery such as a battery temperature abnormality.

The present invention is applied also to a work vehicle having a battery serving as a driving source for work and a work vehicle management system having any of the above-described configurations.

A high-performance tablet computer capable of wireless data communication is included in some recent work vehicles. By including a battery deterioration information generation unit as an application program in this tablet computer, a work vehicle management system of the present invention, which includes the above-described preferable embodiments can be built in the interior of the work vehicle.

Other characteristics and advantages to be demonstrated hereinafter will become apparent upon reading the following description.

DESCRIPTION OF THE INVENTION

In the embodiment described hereinafter, the work vehicle is an electric grass mower. Note that in the present specification, unless otherwise stated in particular, "front" means forward in the front-rear direction (traveling direction) of the vehicle body, and "rear" means rearward in the front-rear direction (traveling direction) of the vehicle body. Also, the right-left direction or lateral direction means the direction that traverses the machine body (machine body width direction), which is orthogonal to the vehicle body front-rear direction. "Up" and "down" are positional relationships in the vertical direction (perpendicular direction) of the vehicle body and indicate relationships with respect to the aboveground height.

Overall Configuration of Grass Mower

Figure 1:
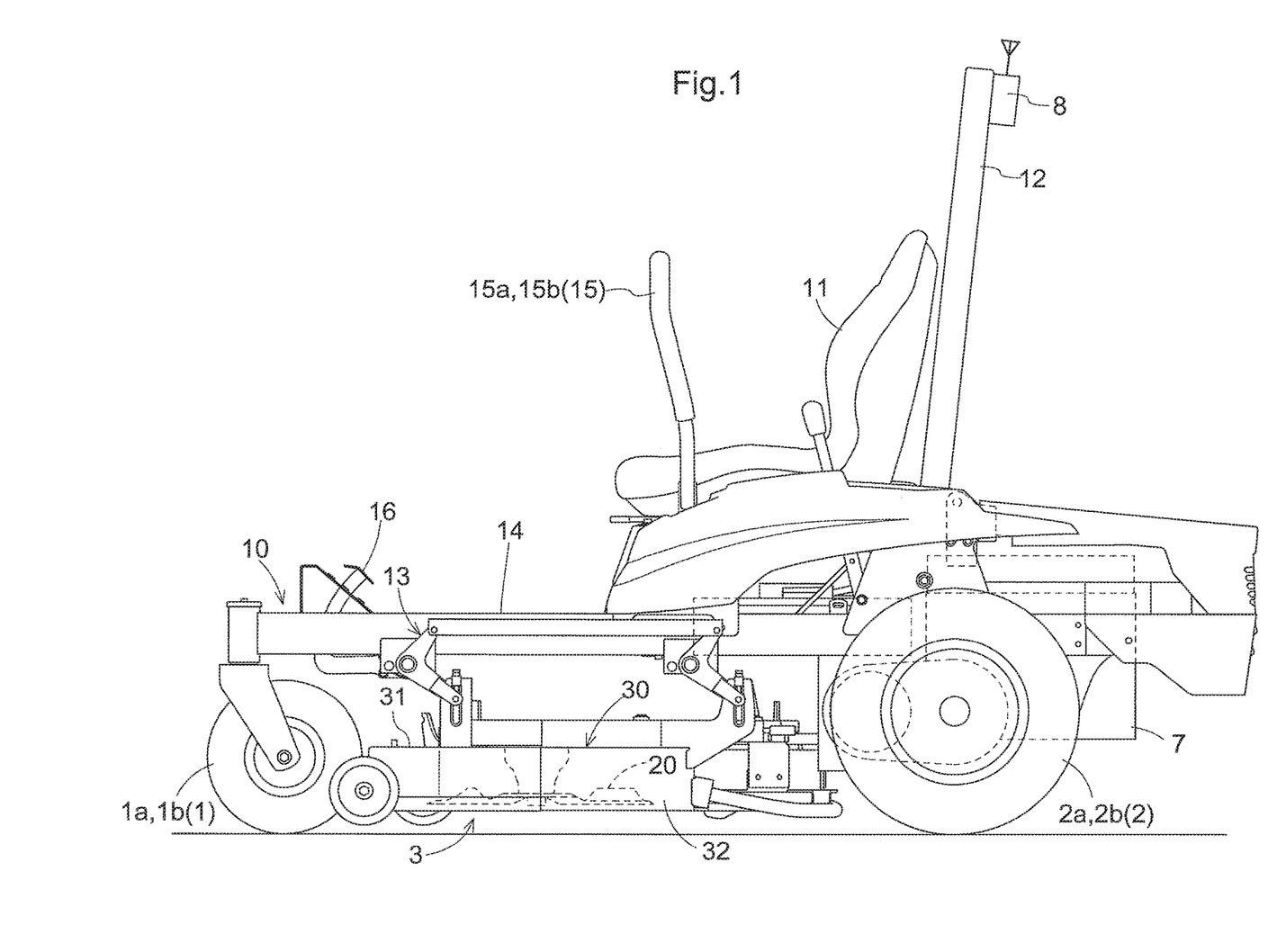
FIG. 1 is a side view of a mid-mount riding electric grass mower equipped with a mower unit, according to an embodiment.

FIG. 1 is a side view of an electric grass mower (referred to as a "grass mower" hereinafter). The grass mower includes: a front wheel unit 1 having a left front wheel 1a and a right front wheel 1b that are of a caster type and can freely rotate; a drive wheel unit 2 that includes a left rear wheel 2a and a right rear wheel 2b; a vehicle body frame 10 that is supported by the front wheel unit 1 and the drive wheel unit 2; a battery 7 that is arranged on the rear portion of the vehicle body frame 10; a driver's seat 11 arranged forward of the battery 7; a rollover protection frame 12 standing upright rearward of the driver's seat 11; and a mower unit 3 that is suspended from the vehicle body frame 10 in a space below the vehicle body frame 10, between the front wheel unit 1 and the driving wheel unit 2, such that the mower unit 3 can be lifted and lowered by a lifting/lowering link mechanism 13. A satellite positioning module 8, including an antenna that receives satellite radio waves, is attached to the peak of the rollover protection frame 12.

A floor plate 14, on which the driver's feet can be placed, is provided forward of the driver's seat 11; and a brake pedal 16 protrudes through the floor plate 14. A steering unit 15 is provided on opposite sides of the driver seat 11, including a left steering lever 15a and a right steering lever 15b that pivot about a horizontal pivot axis in a direction that traverses the vehicle body. The rotational speed of the left rear wheel 2a can be changed using the left steering lever 15a, and the rotation speed of the right front wheel 1b can be changed using the right steering lever 15b. The rotational speeds of the left rear wheel 2a and the right rear wheel 2b can be individually changed, and a sharp turn can be made by setting the rotation directions thereof to be reversed relative to each other.

The mower unit 3 includes a mower deck 30 and two rotary cutter blades 20. The left cutter blade 20 and the right cutter blade 20 are arranged side by side in a direction that traverses the vehicle body. The mower deck 30 includes a top wall 31 and side walls 32 that extend downward from the outer peripheral edge of the top wall 31. The cutter blades 20 are arranged in the internal space of the mower deck 30, which internal space is defined by the top wall 31 and the side walls 32.

Power System and Control System of Grass Mower

Figure 2:
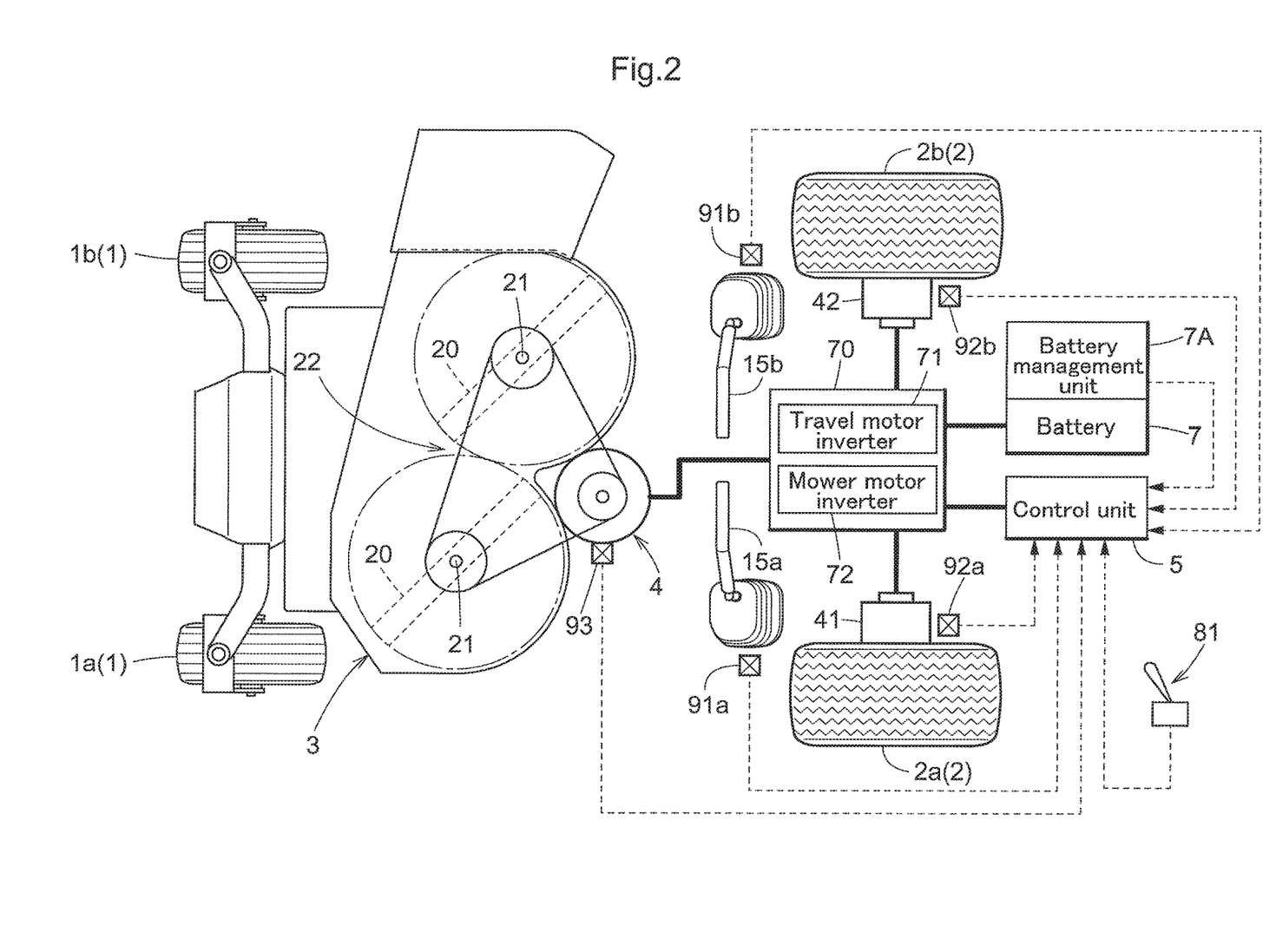
FIG. 2 is a schematic diagram showing a power system and a control system of the electric grass mower.

FIG. 2 shows the power system and the control system of the grass mower. A mower motor 4 is attached to the mower deck 30 for supplying motive power to the rotation shafts 21 mounting the respective cutter blades 20 thereon. A belt transmission mechanism 22 is employed for transmitting motive power from the mower motor 4 to the rotation shafts 21. A left motor 41 is provided for rotating the left rear wheel 2a, and a right motor 42 is provided for rotating the right rear wheel 2b. In this embodiment, the left motor 41 and the right motor 42 are traveling motors which are driven independent of each other.

Electric power is supplied from an inverter 70 to the left motor 41, the right motor 42 and the mower motor 4. The inverter 70 includes a travel motor inverter 71 that supplies electric power to the left motor 41 and the right motor 42, and a mower motor inverter 72 that supplies electric power to the mower motor 4. The inverter 70 is driven based on a control signal from the control unit 5. The inverter 70 is connected to the battery 7 serving as the power source. The battery 7 is provided with a battery management unit 7A that performs management of charging/discharging of the battery 7, calculation of the SOC, calculation of the battery voltage, calculation of the number of instances of charging/discharging, and the like.

In this embodiment, three (3) work modes with different loads on the battery 7 are set in the control unit 5, so that the driver can select his/her desired one of the modes using a work mode selection tool 81 to perform grass mowing work accordingly. The three (3) work modes are an eco-friendly mode, a standard mode and a full-power mode. The eco-friendly mode is an energy-saving mode that suppresses power consumption and is intended for long-term work and low noise. The standard mode is a mode that is intended for a favorable balance between the grass cutting ability and the power consumption. The full-power mode is a mode in which the output is hardly restricted at all, and is intended for demonstration of the maximum grass cutting ability. Of course, the load on the battery 7 is at its maximum in the full-power mode, the standard mode has the next-highest load, and the eco-friendly mode has the smallest load.

Functional Blocks of the Control System

Figure 3:
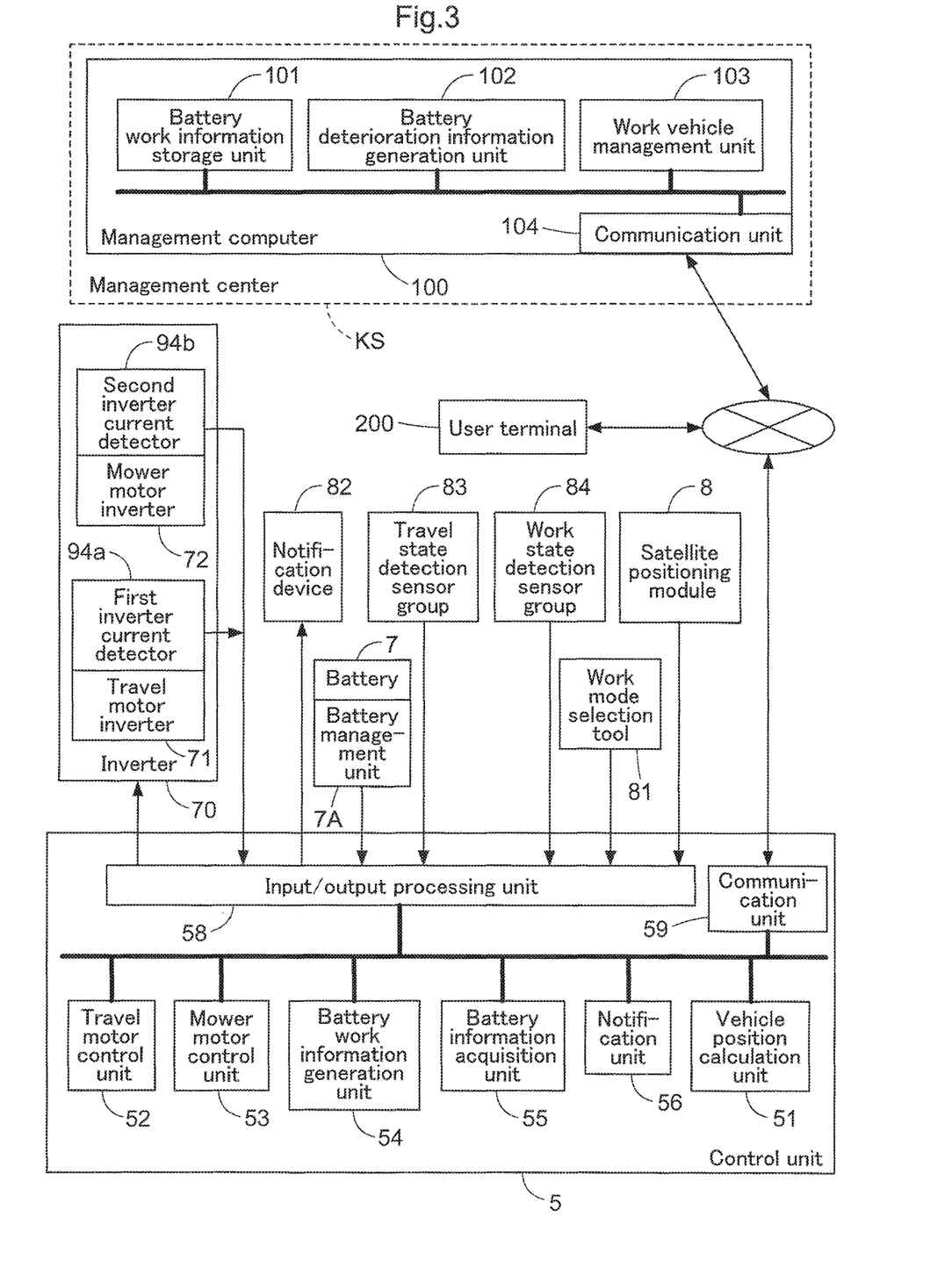
FIG. 3 is a functional block diagram of a control system.

FIG. 3 shows a control system that is built in the above-described grass mower, and functional units that constitute the work vehicle management system of a management computer 100. The management computer 100 is set in a management center KS located away from the work site, and performs a cloud service. Note that in the case of a small-scale system, the functional units built in the management computer 100 are built in a user terminal 200 that can perform data communication. In this embodiment, the management computer 100 functions as a data processing apparatus that can perform data communication with the control system of the grass mower.

A control unit 5, which is a core element of the control system of the grass mower, is provided with an input/output processing unit 58 that functions as an input/output interface, and a communication unit 59. The inverter 70, a battery management unit 7A, the work mode selection tool 81, a satellite positioning module 8, a notification device 82, a travel state detection sensor group 83, a work state detection sensor group 84, etc. are connected to the input/output processing unit 58. The inverter 70 includes a travel motor inverter 71 and a mower motor inverter 72. The travel state detection sensor group 83 includes a left steering angle detection sensor 91a, a right steering angle detection sensor 91b, a left motor rotation detection sensor 92a and a right steering angle detection sensor 92b, which are shown in FIG. 2; and further includes a first inverter current detector 94a, which is shown in FIG. 3. The work state detection sensor group 84 includes a mower motor rotation detection sensor 93, a second inverter current detector 94b, etc. The first inverter current detector 94a detects the current of the travel motor inverter 71, and the second inverter current detector 94b detects the current of the mower motor inverter 72.

As the battery information, the battery management unit 7A provides the control unit 5 with the battery temperature, the battery voltage, the number of instances of charging/discharging, chronological data of the SOC, the SOC when fully-charged, the calculation of the battery voltage, the calculation of the number of instances of charging/discharging, etc.

The notification device 82 includes a device for notifying the driver of various types of information, including the battery deterioration information which will be described in detail later. Such a device may include a buzzer, a speaker, an LED (light emitting diode) and a flat panel display. The communication unit 59 functions to transmit the data processed by the control unit 5 to the management computer 100, that is built in the management center KS at a remote location, and/or the user terminal 200, and further functions to receive various types of data from the management computer 100.

Control Unit 5

The control unit 5 includes a vehicle position calculation unit 51, a travel motor control unit 52, a mower motor control unit 53, a battery work information generation unit 54, a battery information acquisition unit 55 and a notification unit 56.

The vehicle position calculation unit 51 calculates the vehicle position based on the position information from the satellite positioning module 8 employing GPS and the like. In this embodiment, the vehicle position calculation unit 51 includes map data, and therefore not only the longitude/latitude data, but also the address of the work site and the like are outputted as the vehicle position. Also, since date-time data is also included in the position information, it is also possible to derive the weather and the like during work, based on the address of the work site and the date-time data by using a web service or the like.

The travel motor control unit 52 includes a left wheel speed calculation function, a right wheel speed calculation function and a control signal generation function. The left wheel speed calculation function calculates the rotation speed (rotation rate) of the left rear wheel 2a, that is, the rotation speed (rotation rate) of the left motor 41 based on the detection signal from the left steering angle detection sensor 91a that detects the operation amount of the left steering lever 15a operated by the driver. The right wheel speed calculation function calculates the rotation speed (rotation rate) of the right rear wheel 2b, that is, the rotation speed (rotation rate) of the right motor 42 based on the detection signal from the right steering angle detection sensor 91b that calculates the operation amount of the right steering lever 15b operated by the driver. The control signal generation function generates a control signal for supplying the electric power needed to realize the calculated rotation speed of the left motor 41 and the calculated rotation speed of the right motor 42 to the left motor 41 and the right motor 42, respectively; and provides the travel motor inverter 71 with the control signal. The travel motor inverter 71 independently supplies electric power to the left motor 41 and to the right motor 42. Accordingly, the rotation speeds of the left rear wheel 2a and the right rear wheel 2b can be made different from each other, and the direction of the grass mower is changed due to the speed difference between the right and left rear wheels.

The mower motor control unit 53 controls the mower motor inverter 72 to drive the mower motor 4. In this embodiment, each of the travel motor control unit 52 and the mower motor control unit 53 corrects the control signal to be provided to the inverter 70, according to the work mode selected using the work mode selection tool 81.

The battery work information generation unit 54 generates battery work information indicating the use state of the battery 7 during work travel of the grass mower. The battery work information includes the location of the work site on which the work travel is carried out, the work date and time, and the work load level of the work travel. The location of the work site, and the work date and time are obtained from the vehicle position calculation unit 51. The work load level is determined based on the selected work mode and work time. In order to express the detailed work load level, the battery work information includes the inverter electric power generated by the inverter 70, the battery information (battery temperature, battery voltage, number of instances of charging/discharging, etc.) obtained from the battery management unit 7A. The ID of the battery, the ID of the work vehicle, the ID of the driver, etc. are added to the battery work information.

In the present embodiment, the battery information acquisition unit 55 downloads the battery deterioration information generated by the management computer 100 and provides the notification unit 56 with the battery deterioration information. Acquisition of the battery deterioration information by the battery information acquisition unit 55 may be performed automatically during activation of the grass mower, for example, or may be performed manually at any timing in response to an operation instruction performed by the driver. The notification unit 56 generates the notification data based on the battery deterioration information and performs notification of the battery deterioration information through the notification device 82. Note that the battery information acquisition unit 55 can also perform notification of the content of the battery information obtained from the battery management unit 7A by providing the notification unit 56 with the battery information.

Functional Units of the Management Computer 100

In this embodiment, the management computer 100, which can exchange data with the control unit 5 of the grass mower using a data communication line and the communication unit 104, includes functional units that manage the work travel state of the grass mower, and in particular, the use state of the battery 7. In more specific, the battery work information storage unit 101, a battery deterioration information generation unit 102 and a work vehicle management unit 103 are built in the management computer 100.

The battery work information storage unit 101 accumulates the battery work information that was generated by the battery work information generation unit 54 of the grass mower and was uploaded, such that the battery work information can be sorted according to the ID of the battery 7, the ID of the grass mower (work vehicle), the ID of the driver and the like, and can be sorted chronologically. The work vehicle management unit 103 stores and manages the information related to various work vehicles is to be managed, including the grass mower; and the information may include work content/history data of the work vehicle, such as the work vehicle ID, manager data and work site data.

The battery deterioration information generation unit 102 extracts, from the work vehicle management unit 103, the management data and other various specification data of the grass mower to be processed; and extracts, from the battery work information storage unit 101, the battery work information of the grass mower that is to be diagnosed. The battery deterioration information generation unit 102 chronologically diagnoses the battery work information to generate the battery deterioration information indicating the deterioration trend of the battery 7 unique to the grass mower. A machine learning algorithm, that receives input of various types of data included in the battery work information and outputs the battery deterioration level, is appropriate as the method for generating the battery deterioration information from the battery work information.

In order to generate the battery deterioration information from the battery work information in a simple manner, it is preferable to derive the battery overuse level based on the temperature history data, the voltage history data and the charging/discharging instance count data, taken from the battery work information. In the algorithm for deriving the battery overuse level, each piece of data is classified based on the load level on the battery 7; and the battery overuse level is determined through statistical calculation of the classification value of the temperature history data, the classification value of the voltage history data and the classification value of the charging/discharging count data, such as the total value of the classification values, a weighted average value of the classification values or the like. If the battery overuse levels are "excellent", "good", "acceptable" and "not acceptable", for example, the driver of the grass mower may be notified, in a simple method (e.g. a message on an LED display device or other display devices), of whether or not the grass mower has been made with consideration given to the battery.

The deterioration of the battery 7 is influenced by the state of the work site such as the weather, the work load level of the performed work travel and the like. Accordingly, if the battery overuse level is derived from the battery work information, it is important to keep track of the environment information of the work travel. The environment state such as the ground state, the weather and the like of the work site on that day can be derived from the vehicle position during work travel of the work vehicle and the work date and time of the work vehicle, through a web service or the like. Also, the work load level of the work travel can be readily estimated based on the work mode that is selected during the work. The battery deterioration information generation unit 102 has a function of adding such data indicating the work environment, as attribute information of the battery deterioration information.

The battery deterioration information generation unit 102 includes processing functions for generating various types of data to be included in the battery deterioration information. Examples thereof are listed below.

(1) A function of performing estimation of the work trend and estimation of the battery deterioration trend based on a chronological evaluation of the work date and time and the work mode, and using the estimation result as the battery deterioration information.
(2) An auxiliary function of correcting the original data relating to battery deterioration included in the battery deterioration information according to the work travel location.
(3) A function of calculating motor consumption energy for each driver or for each grass mower.
(4) A function of statistically analyzing the work time and the work amount for each driver or for each grass mower.
(5) A function of, if the battery 7 is constituted by multiple battery packs, calculating the overuse level for each battery pack using the battery pack ID.
(6) A function of calculating the battery lifespan from the SOC when fully-charged.
(7) A function of calculating a deterioration correction value during battery storage from the SOC when the vehicle is stopped.
(8) A function of statistically analyzing a battery abnormality such as a battery temperature abnormality.
(9) A function of deriving an appropriate work load level that is to be recommended for appropriate use of the battery 7, from data obtained by the above-described functions.

Note that the above-described battery work information storage unit 101, the battery deterioration information generation unit 102 and the work management unit 103 can also be built in a user terminal 200 such as a tablet computer owned by a user. In this case, with the configuration shown in FIG. 3, the user terminal 200 functions as a data processing apparatus that can perform data communication with the control system of the grass mower, instead of the management computer in the management center KS. The user terminal 200 is connected wirelessly or by wire to an onboard LAN of the grass mower and performs functions corresponding to the above-described management computer 100. Also, at least one or its portion of the battery work information generation unit 54, the battery information acquisition unit 55 and the notification unit 56 may be built in such a user terminal 200. Whereby, the work vehicle management system according to the present invention can be built in the conventional grass mower, with substantially no modification of the grass mower.

Also, in the above-described embodiment, the battery work information includes temperature history data, SOC history data, voltage history data and charging/discharging instance count data. The battery deterioration information generation unit 102 calculates the battery overuse level as the battery deterioration information based on the temperature history data, the SOC history data, the voltage history data and the charging/discharging count data. Furthermore, the battery overuse level is calculated based on the temperature history, the SOC history, the voltage history and the number of instances of charging/discharging, and notification of this battery overuse level is performed.

A simple example of the battery overuse level is the total value of the values obtained by scoring the temperature history, the SOC history, the voltage history and the number of instances of charging/discharging, using thresholds corresponding respectively thereto. Furthermore, the levels "excellent", "good", "acceptable" and "not acceptable" are determined based on the total value, and are ultimately notified through an LED display device or the like. Of course, the data used as the data indicating battery deterioration may be one of the temperature history data, the SOC history data, the voltage history data and the charging/discharging instance count data, and other data may also be employed.

However, calculating the battery overuse level as the battery deterioration information is optional, and the precise deterioration state of the battery can be kept track of as long as the battery overuse level can be checked based on at least one type of the above-described data.

The configuration disclosed in the above-described embodiment (including the other embodiments described below) can be applied in combination with a configuration disclosed in another embodiment as long as there is no discrepancy. The embodiments disclosed in the present specification are exemplary, and the embodiments of the present invention are not limited to this and can be modified as appropriate without departing from the object of the invention.

Other Embodiments (1) The above-described battery work information storage unit 101, battery deterioration information generation unit 102 and work vehicle management unit 103 may be provided in the onboard LAN of the grass mower.
(2) In the above-described embodiment, a grass mower was given as a work vehicle, but the present invention can also be applied to an agricultural work machine such as a combine, a tractor, a rice transplanter and a tiller, and a work machine for another field (e.g., a construction machine such as a backhoe). That is, the work vehicle of the present invention encompasses both grass mowers and agricultural work machines that often perform work while causing the vehicle body to travel ("work travel") and construction machines that often only perform work while the vehicle body is stopped ("non-traveling work").

What is claimed is:

1. A work vehicle management system for managing a work vehicle configured to perform work using a battery as a driving source, comprising:
   a satellite positioning module configured to detect position information associated with a position of the work vehicle;
   a vehicle position calculation unit configured to determine a location of a work site where the work is carried out and a work date and time based on the position information;
   a battery work information generation unit configured to generate battery work information that indicates a use state of the battery during the work of the work vehicle, wherein the battery work information includes the location of the work site where the work is carried out, the work date and time of the work, and a work load level of the work;
   a battery deterioration information generation unit configured to chronologically diagnose the battery work information to generate battery deterioration information that indicates a deterioration trend of the battery that is unique to the work vehicle; and
   a notification unit configured to perform notification of the battery deterioration information to a manager of the work vehicle,
   wherein a recommended work load level recommended for use of the battery is added as attribute information of the battery deterioration information,
   wherein the battery work information includes a location of a work site where the work is carried out, a work date and time of the work, and a work load level of the work,
   wherein a recommended work load level recommended for use of the battery is added as attribute information of the battery deterioration information, and
   wherein an environment state including weather of the work site, derived from the location of the work site where the work is carried out and the work date and time of the work, is added as attribute information of the battery deterioration information.

2. The work vehicle management system according to claim 1, wherein
   the battery work information generation unit and the notification unit are included in a control system of the work vehicle, and
   the battery deterioration information generation unit is included in a data processing apparatus that is configured to perform data communication with the control system.

3. The work vehicle management system according to claim 2, wherein
   the data processing apparatus is provided in a management center away from a work site or in a user terminal owned by a user of a work vehicle, and is connected to and communicates with an onboard LAN (local area network) of a work vehicle wirelessly or by wire.

4. The work vehicle management system according to claim 1, wherein the battery work information includes at least one of temperature history data, SOC (state of charge) history data, voltage history data and charging/discharging instance count data, and
the battery deterioration information generation unit calculates a battery overuse level as the battery deterioration information based on at least one of the temperature history data, the SOC history data, the voltage history data and the charging/discharging instance count data.

5. The work vehicle management system according to claim 1, wherein
   the battery work information includes at least one of temperature history data, SOC history data, voltage history data and charging/discharging instance count data, and
   the battery deterioration information generation unit checks a battery overuse level based on at least one of the temperature history data, the SOC history data, the voltage history data and the charging/discharging instance count data.

6. The work vehicle management system according to claim 1, wherein the recommended work load level is derived from data obtained from at least one of the following functions:
   (1) a function of performing estimation of a work trend and estimation of the battery deterioration trend based on a chronological evaluation of a work date and time and a work mode, and using the estimation result as the battery deterioration information;
   (2) a function of correcting original data relating to battery deterioration included in the battery deterioration information according to a work travel location;
   (3) a function of calculating motor energy consumption for each driver or for each work vehicle;
   (4) a function of statistically analyzing a work time and a work amount for each driver or for each work vehicle;
   (5) a function of, if the battery is constituted by a plurality of battery packs, calculating an overuse level for each battery pack using a battery pack ID;
   (6) a function of calculating a battery lifespan from a battery remaining amount when fully-charged;
   (7) a function of calculating a deterioration correction value during battery storage from the battery remaining amount when the vehicle is stopped; and
   (8) a function of statistically analyzing an abnormality of the battery such as a battery temperature abnormality.

7. A work vehicle comprising:
   a first inverter current detector configured to detect a current of a travel motor inverter;
   a second inverter current detector configured to detect the current of a work motor inverter;
   a battery serving as a driving source for work of the work vehicle;
   a battery work information generation unit configured to generate battery work information indicating a use state of the battery during the work;
   a battery deterioration information generation unit configured to chronologically diagnose the battery work information to generate battery deterioration information that indicates a deterioration trend of the battery that is unique to the work vehicle; and
   a notification unit configured to perform notification of the battery deterioration information,
   wherein the battery work information includes a location of a work site where the work is carried out, a work date and time of the work, a work load level of the work, and an inverter electric power generated by the travel motor inverter and the work motor inverter, wherein a recommended work load level recommended for use of the battery is added as attribute information of the battery deterioration information, and wherein an environment state including weather of the work site, derived from the location of the work site where the work is carried out and the work date and time of the work, is added as attribute information of the battery deterioration information.

* * * * *